Patented Nov. 18, 1941

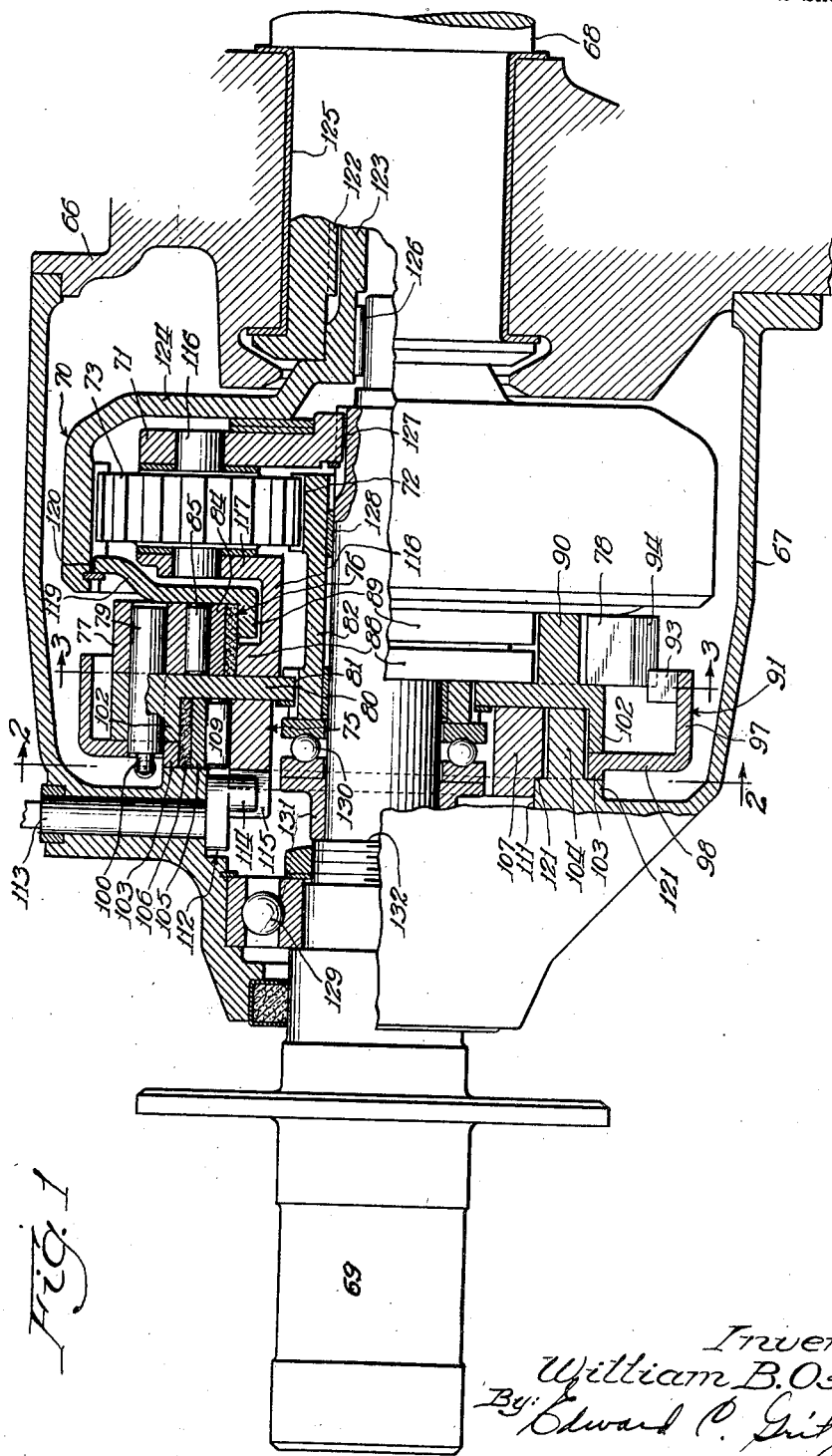

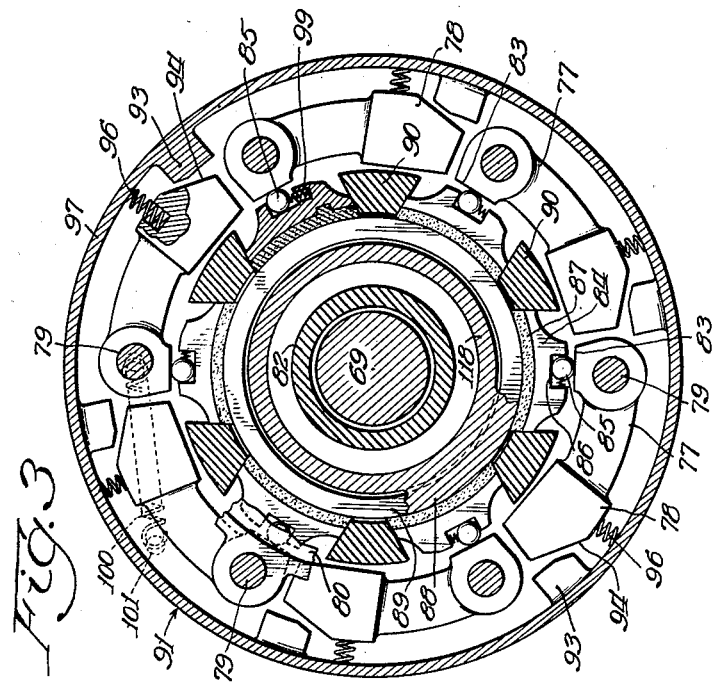

2,262,959

UNITED STATES PATENT OFFICE 2,262,959

PLANETARY TRANSMISSION

William B. Osborne, Muncie, Ind., assignor to Borg-Warner Corporation, Chicago, Ill., a corporation of Illinois Application December 11, 1939, Serial No. 308,624

19 Claims. (Cl. 74—260)

This invention relates to planetary transmissions and has as its general object to provide a two-speed transmission particularly adaptable for aircraft propeller drive purposes. This application in part forms a continuation of my pending application Serial No. 213,968, filed June 16, 1938, allowed July 17, 1939, now Patent No. 2,189,220, for Planetary gear drive, and the entire dsiclosure of that application is incorporated herein by reference.

A primary object of the invention is to provide a transmission wherein a shift from one gear ratio to another may be effected without passing through a neutral position, i. e., without releasing the driving connection between the driving and driven members at any point in the shift. This feature is particularly desirable in an airplane propeller drive.

More specifically, the invention contemplates the provision of a transmission adapted to transmit selectively from a driving to a driven member, either an underdrive or a direct drive, underdrive being effected by driving from the ring gear to the carrier of the planetary gearing, the sun gear being held stationary in order to establish the underdrive, and direct drive being effected by releasing the sun gear and simultaneously establishing a lock-up between at least two of the planetary members through the medium of a friction clutch.

The invention further contemplates the employment of centrifugal means for effecting the engagement of the clutch, and such centrifugal means is preferably arranged to respond to the rotation of the sun gear, and is therefore inoperative while the sun gear is restrained from rotation and is made operative when the sun gear is released and allowed to rotate.

A further object of the invention is to provide, in a transmission of the character indicated above, means, operable in conjunction with the restraining of sun gear rotation, for rendering the centrifugal mechanism of the clutch inoperative so as to facilitate the release of the clutch and thereby make it possible to reestablish the underdrive following a period of direct drive operation.

Another object of the invention is to provide an improved braking mechanism for controlling the sun gear. The invention further contemplates an improved arrangement of sun gear braking mechanism, and means, incorporated therein for developing torque for rendering the centrifugal mechanism of the clutch inoperative upon the application of the sun gear brake.

Another object of the invention is to provide an improved clutch arrangement for establishing the direct drive. In this connection, the invention aims to avoid the transmission of torque through the planetary gears. Instead, provision is made for a direct lock up between the ring gear and the planetary carrier so as to bypass the gears, when the transmission is operating in direct drive.

Other objects, the advantages and uses of the invention will become more apparent after reading the following specification and claims and after consideration of the drawings forming a part of the specification, wherein:

Fig. 1 is a side elevation, partly in section, of a transmission embodying the invention;

Fig. 2 is a transverse sectional view thereof taken as indicated by the line 2—2 of Fig. 1; and Fig. 3 is a transverse sectional view taken as indicated by the line 3—3 of Fig. 1.

As an illustration of one form in which the invention may be embodied, I have shown in the drawings a planetary transmission particularly adapted for employment as a two-speed drive between the engine and propeller of an airplane, comprising in general a two-part housing 66, 67, driving and driven shafts 68, 69 adapted to be connected respectively to an engine and propeller of an airplane, a ring gear 70 attached to the drive shaft 68, a planet carrier 71 attached to the driven shaft 69, a sun gear 72, planet gears 73 journalled on the carrier and the meshing with the ring gear 70 and sun gear 72, a brake, indicated generally at 75, for locking the sun gear against rotation, and a clutch, indicated generally at 76 for locking the transmission in direct drive.

In general, the invention contemplates an arrangement wherein as the brake is released the clutch will become engaged and vice versa so that a drive will always be maintained from the driving shaft 68 to the driven shaft 69. This is important in aircraft construction, in order that the pilot may retain full control over the propeller at all times.

In order to accomplish this general object, the clutch 76 is arranged to be engaged by centrifugal mechanism carried by the sun gear and therefore responsive to sun gear rotation so that, when the sun gear is released for rotation, the centrifugal mechanism will become operative and the direct drive will thereupon be established.

The centrifugal elements, in the form of levers 77, having weighted ends 78, are pivoted on pins 79 mounted in an annular plate 80 which is splined as at 81 to the extended hub 82 of the sun gear 72.

The levers 77 are formed with camming portions 83 adapted, as the weighted ends 78 move radially outwardly, to exert radially inwardly directed pressure against clutch shoes 84 through the medium of rollers 85 confined between the camming portions 83 and sockets 86 formed in the shoes 84. The shoes 84 are provided with friction facings 87 which are adapted to simultaneously engage a pair of axially adjacent clutch drums 88 and 89 carried by the planet carrier 71 and ring gear 70 respectively. Thus when the clutch is engaged, a direct connection between the ring gear and carrier, bypassing the planet gear 73, will be established, and no torque will be transmitted through the gear teeth. The shoes 84 are confined circumferentially between lugs 90 formed on the sun gear plate 80, and thus the sun gear also will be locked to the ring gear and carrier by the operation of the clutch, although it is to be understood that this result is incidental to the direct lockup between the carrier and the ring gear which is particularly aimed at.

Being rotatable with the sun gear, the clutching mechanism will come into operation when the sun gear is released for rotation by the brake 75, and will return to an inoperative state when rotation of the sun gear is restrained. I find, however, that the brake 75 cannot be relied upon as the sole means for restoring the underdrive when the transmission is operating in direct drive, for the reason that the engagement of the clutch constrains the sun gear to rotate along with the other rotating parts, and the rotation of the sun gear maintains the clutch in engagement.

It is important that provision be made for shifting the transmission from direct back to underdrive without arresting the drive through the transmission. In the operation of an airplane, emergencies may arise in the air or in landing, making it desirable for the pilot to go into a sudden climb, and therefore requiring the reestablishment of underdrive. In order to meet this problem, the invention provides means for neutralizing or opposing the centrifugal action of the levers 77 sufficiently to allow the clutch to slip as the brake 75 is applied.

Such declutching mechanism comprises a declutching ring 91, having a series of circumferentially elongated apertures 92 through which the lever fulcrum pins 79 extend, and having a series of cam projections 93 adapted, as it moves from one extremity to the other of its lost motion connection formed by the pins 79 and slots 92, to engage inclined cam faces 94 on the weighted ends 78 of the levers, and force said weighted ends inwardly so as to release the clutch. The inward movement of the weighted ends of the levers is assisted by coil springs 96 interposed between the weighted ends and the rim 97 of the ring 91. It may be noted at this point that the ring 91 is L-shaped in cross-section, including the rim flange 97 and the radial flange 98 in which the openings 92 are formed. The cam projections 93 extend inwardly from the rim flange 97.

The thrust transmitting connection between the cam portions 83 of the levers and the clutch shoes 84 is purely a rolling one, in order to minimize frictional resistance, and to this end, the sockets 86 are wider than the rollers 85 and each roller is urged to one extremity of its socket by means of a compression spring 99.

The declutching ring 91 is normally maintained in its inoperative position by tension springs 100 each having one end attached to a post 79 and its other end attached to a stud 101 fixed in the flange 98.

The ring is moved to its operative position by torque developed in the operation of the braking mechanism which will now be described.

Formed on the sun gear plate 80 is a brake drum 102. Formed on the inner periphery of the flange 98 of the ring 91 is a brake drum 103, axially adjacent the drum 102. Mounted between lugs 104 formed in the housing 67 and projecting into the space defined by the brake drum 102, are a series of brake shoes 105 having friction facings 106 adapted to simultaneously engage the drums 102 and 103. The engagement with the drum 102 restrains the rotation of the sun gear. The engagement with the drum 103 shifts the declutching ring 91 to operative position wherein the levers 77 are cammed inwardly to release the clutch. Shoes 105 are narrower than the space between lugs 104 to allow for a slight relative circumferential movement between the lugs and shoes. A spring 133 normally biases the shoes 105 in a counter-clockwise direction as viewed in Fig. 2. A tongue and groove connection 134 provides a positive lock between the friction facings 106 and shoes 105 to cause the latter to move with the facings. This construction provides a servo-action for the brake shoes which makes it possible to arrest the rotation of the sun gear with the application of a smaller force than would otherwise be necessary.

The brake shoes 105 are actuated by an annular cam ring 107 having cam faces 108 engaging rollers 109 confined in sockets 110 in the respective shoes.

The cam ring 107 is formed with a portion of reduced diameter journalled in a shoulder 111 formed in the housing 67. Movement of the ring 107 may be effected by a manual control including an eccentric 112 having a shaft portion 113 journalled in the housing 67 and an eccentric pin 114 engaged in a notch 115 in the ring 107.

The planet gears 73 are journalled on pins 116 mounted in the carrier 71. The carrier clutch drum 88 is formed on an annular plate 117 mounted on the pins 116, being connected to the plate 117 by a sleeve 118 extending through the open drum 89 of the ring gear. The drum 89 is formed on an annular plate 119 having an internally splined engagement 120 with the ring gear 70. The plate 119 cooperates with the sun gear plate 80 in forming an annular space in which the clutch shoes 76 are mounted for radial sliding movement between the lugs 90. The radial wall 121 of the shoulder 111 cooperates with the other side of the sun gear plate 80 in forming an annular space in which the brake shoes 105 are confined for radial sliding movement between the lugs 104. The driving member 68 may be in the form of a sleeve splined as at 122 to the shank 123 of the ring gear drum 124, and may be journalled in a bushing 125 mounted in the housing member 66. The driven shaft 69 is piloted in the shank 123 by means of roller bearings 126. The carrier 71 may be connected to the driven shaft 69 by means of a spline connection 127. The hub portion 82 of the sun gear is preferably journalled upon the drive shaft 68 as by means of bearings 128. The driven shaft 69 may be journalled in the housing member 67 by means of a roller bearing 129. The sun gear assembly is maintained against axial displacement by a thrust bearing 130 interposed between the end of the sun gear hub 82 and an abutment ring 131 engaged against a shoulder 132 formed in the driven shaft 69.

In the operation of the transmission, when embodied in an airplane for example, the underdrive gear ratio may be established prior to starting the engine by rotating the manual control eccentric 112 so as to move the ring 107 to the position in which it cams the brake shoes 105 outwardly into engagement with the brake drum 102. The brake drum 103 will also be engaged but without effect upon the declutching ring 91 for the reason that the springs 100 will hold the latter in its inoperative position. The engagement of the brake drum 102 locks the sun gear 72 against rotation. As a result, when the engine is started, drive will be transmitted from the drive shaft 68 to the ring gear 70 and thence through the planet gears 73 to the carrier 71, the planet gears 73 tracking against the stationary sun gear 72 so as to deliver drive to the carrier at a reduced rate of speed as compared to that of the driving shaft.

The speed reduction will give a corresponding increase in torque which is utilized to overcome the heavier loads imposed upon the propeller in the take off and climb for elevation.

When the pilot desires to level off for horizontal flight, he rotates the control eccentric 112 in a reverse direction so as to release the brake and allow the sun gear to commence rotating under the torque reaction of the planet gears 73. By momentarily decelerating the engine, the planet carrier may be caused to become the driving member and the ring gear the reaction member, and the resulting direction of thrust of the planet gears against the sun gear will be the same as the direction of rotation of the already rotating ring gear and planet carrier.

The rotation of the sun gear, thus initiated, will cause the weighted levers 77 to fly outwardly, camming the clutch shoes 84 radially inwardly into clutching engagement with the clutch drums 88 and 89 respectively. As soon as the clutch becomes engaged, rotation will be transmitted to the sun gear from the ring gear and carrier, thus maintaining the centrifugal elements energized and the clutch engaged. Accordingly, the ring gear, carrier and sun gear will remain locked together as long as the drive shaft continues to rotate at a sufficient speed to energize the centrifugal elements. In the event that the pilot desires to shift back to underdrive while in the air, he simply rotates the control eccentric 112 to brake engaging position, causing the brake shoes 105 to be forced outwardly against the brake drum 102 and the drum 103. In its initial stage, the braking engagement against the brake drum 102 will be ineffective to restrain the rotation of the sun gear, for the reason that the clutch will remain engaged as long as the sun gear is rotating at a sufficient speed, and the sun gear will continue to rotate as long as the clutch is engaged and the drive shaft is driving. However, the engagement against the drum 103 will be immediately effective. The declutching ring 91, which has been rotating along with the gear, under the pull of the springs 100, will be momentarily retarded sufficiently to move it to the opposite extremity of its lost motion connection against the pull of the springs 100 and in so moving, it will render the centrifugal levers 77 inoperative by the camming engagement of its cam projections 93 with the cam faces 94 of the levers. Thus the clutch is released, and the braking action against the brake drum 102 will become effective to arrest the rotation of the sun gear and thereby reestablish the underdrive.

Engagement of the brake will assure the release of the clutch under all conditions. If the transmission is operating, the release will be effected by the camming mechanism in the manner described above. If the transmission is not operating, the camming mechanism of course will be ineffective as a result of the springs 100 returning the declutching ring to its inoperative position, but in this case the springs 96 will move the clutching levers inwardly to their inoperative position, thereby assuring full clutch release.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a planetary transmission, in combination with a sun gear, a carrier, planet gears on the carrier meshing with the sun gear, and a ring gear adapted to underdrive the carrier through the planet gears when rotation of the sun gear is restrained, a centrifugal clutch adapted to lock the ring gear to the carrier and to thereby establish direct drive through the transmission, a brake adapted to lock the sun gear against rotation to establish underdrive, means for controlling the operation of the brake, and means, operated by said brake operating means during the sun gear locking operation, for neutralizing the centrifugal action of said clutch so as to release said direct drive and thereby facilitate the establishing of underdrive following direct drive operation.

2. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch adapted to lock two of said elements together so as to establish a direct drive through the transmission, a brake for restraining the sun gear, means for controlling the operation of the brake, and means, operated by said brake operating means, during such restraining operation, for opposing the centrifugal action of said clutch so as to facilitate the release of said direct drive and the establishing of underdrive following direct drive operation.

3. In a planetary transmission, in combination with planetary elements including a sun gear, a carrier, planet gears and a ring gear in planetary relation to each other, a centrifugal clutch adapted to lock at least two of said elements together so as to establish a direct drive through said transmission, a brake adapted to restrain rotation of one of said elements so as to establish a drive of another ratio through said transmission, means for controlling the operation of the brake, and means, operated by said brake operating means during braking action upon said one element, for opposing the centrifugal action of said clutch so as to facilitate the release of said direct drive and the establishing of the other drive following direct drive operation.

4. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch having centrifugal members responsive to sun gear rotation, adapted to lock at least two of said elements together so as to establish a direct drive through the transmission, a brake for restraining the sun gear, and means, operable in conjunction with the brake during such restraining operation, for moving said centrifugal members to inoperative positions so as to facilitate the release of said direct drive and the establishing of underdrive following direct drive operation.

5. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch adapted to lock two of said elements together so as to establish a direct drive through the transmission, a brake for restraining the sun gear, and means, rotatable with one of said elements, engaged by said brake during the sun gear restraining operation and adapted, under torque developed by its engagement with the brake, to oppose the centrifugal action of the clutch so as to facilitate the release of said direct drive and the establishing of underdrive following direct drive operation.

6. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch adapted to lock two of said elements together so as to establish a direct drive through the transmission, a brake for restraining the sun gear, and means, having a lost motion connection with one of said elements, engaged by said brake during the sun gear restraining operation, adapted to be moved by such brake engagement, and arranged to render the centrifugal mechanism of the clutch inoperative as a result of such movement.

7. In a planetary transmission, in combination with a sun gear, a carrier, planet gears on the carrier meshing with the sun gear, and a ring gear adapted to underdrive the carrier through the planet gears when rotation of the sun gear is restrained, a centrifugal clutch adapted to lock the ring gear to the carrier and to thereby establish direct drive through the transmission, a brake adapted to lock the sun gear against rotation to establish underdrive, and means, having a lost motion drive connection with the sun gear, engageable by said brake during the sun gear restraining operation, adapted to be moved by said brake engagement, and arranged to render the centrifugal mechanism of the clutch inoperative as a result of such movement, so as to facilitate the establishing of underdrive following direct drive operation.

8. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch having centrifugal members responsive to sun gear rotation, adapted to lock two of said elements together so as to establish a direct drive through the transmission, a brake for restraining the sun gear, and a declutching ring having a lost motion driving connection with the sun gear, adapted to be engaged by the brake during the sun gear restraining operation, to be thereby moved and, in thus moving, to engage the centrifugal members and move them to inoperative positions so as to facilitate the release of the direct drive and the establishing of underdrive following direct drive operation.

9. In a planetary transmission, in combination with planetary elements including a sun gear, a carrier, planet gears and a ring gear in planetary relation to each other, a centrifugal clutch adapted to lock at least two of said elements together so as to establish a direct drive through said transmission, said clutch including centrifugal members responsive to rotation of one of said elements, a brake adapted to restrain rotation of one of said elements so as to establish a drive of another ratio through said transmission, means for controlling the operation of the brake and a declutching ring, having a lost-motion connection with one of said elements, adapted to be moved from one to another position of said lost motion connection under control of the brake controlling means, and, during such movement, to engage the centrifugal members and move them to inoperative positions so as to facilitate the release of the direct drive and the establishing of the other drive following direct drive operation.

10. In a planetary transmission, in combination with planetary elements including a sun gear, a carrier, planet gears and a ring gear in planetary relation to each other, a centrifugal clutch adapted to lock at least two of said elements together so as to establish a direct drive through said transmission, said clutch including centrifugal members responsive to rotation of one of said elements, a brake adapted to restrain rotation of said one element so as to establish a drive of another ratio through said transmission, and a declutching ring having a lost motion connection with said one element, adapted to be moved from one to another position of said lost motion connection by torque developed in the restraining operation, and, during such movement, to engage the centrifugal members and move them to inoperative positions so as to facilitate the release of the direct drive and the establishing of the other drive following direct drive operation.

11. In a planetary transmission, in combination with planetary elements including a sun gear, a carrier, planet gears and a ring gear in planetary relation to each other, with the ring gear adapted to underdrive the carrier when rotation of the sun gear is restrained, a centrifugal clutch adapted to lock two of said elements together so as to establish a direct drive through the transmission, a brake for restraining the sun gear, manual means for controlling the brake, and means, operated by the manual means, for opposing the centrifugal action of said clutch so as to facilitate the release of said direct drive and the establishing of underdrive following direct drive operation.

12. In a planetary transmission, planetary elements comprising a sun gear, a carrier and a ring gear in planetary relationship, with the ring gear adapted to underdrive the carrier when rotation of the sun gear is restrained, axially adjacent clutch drums carried by said carrier and ring gear respectively, a clutching shoe associated with the sun gear and adapted to engage said drums for locking all of said elements together for direct drive, centrifugal members carried by the sun gear, for operating said clutching shoe at a predetermined speed of sun gear rotation, a brake for restraining rotation of the sun gear, and a declutching member, carried by the sun gear and acted upon by the brake during the sun gear restraining operation, so as to oppose the action of the centrifugal members, whereby to facilitate the reestablishment of underdrive following a period of direct drive operation.

13. In a planetary transmission, a housing, planetary elements therein comprising a sun gear, a carrier and a ring gear in planetary relationship, with the ring gear adapted to underdrive the carrier when rotation of the sun gear is restrained, a centrifugal clutch, responsive to sun gear rotation, adapted to lock said elements in direct drive, a brake drum carried by the sun gear, a braking shoe associated with the housing and engageable with said drum for restraining sun gear rotation, and a declutching ring having a lost motion connection with the sun gear, having a part adapted to be engaged by said shoe when the latter engages the drum, whereby to move said ring relative to the ring gear, and adapted, when thus moved, to oppose the centrifugal action of the clutch so as to facilitate the reestablishment of underdrive.

14. In a planetary transmission, a housing, planetary elements therein comprising a sun gear, a carrier and a ring gear in planetary relationship, with the ring gear adapted to underdrive the carrier when rotation of the sun gear is restrained, a centrifugal clutch, including centrifugal members carried by the sun gear and adapted, in response to sun gear rotation, to lock said elements in direct drive, a brake drum carried by the sun gear, a brake shoe associated with the housing and engageable with said drum for restraining sun gear rotation, and a declutching ring having a lost motion connection with the sun gear, having a part adapted to be engaged by said shoe when the latter engages the drum, whereby to move said ring relative to the ring gear, and having parts adapted, when thus moved, to exert a camming action against said centrifugal members so as to render them inoperative and thereby facilitate the release of the clutch and the consequent establishment of underdrive.

15. A planetary transmission as defined in claim 13, including a ring, rotatable with reference to the housing, having a cam element adapted, when rotated, to move said brake shoe into braking position.

16. A planetary transmission as defined in claim 13, including an operating ring, rotatable with reference to the housing, having a cam element, adapted, when rotated, to move said brake shoe to braking position and a manually operable eccentric journalled in the housing and cooperating with said operating ring for rotating the same.

17. In a planetary transmission, a housing, planetary elements therein including a ring gear, a carrier and a sun gear in planetary relation to each other, axially adjacent clutch drums attached to the ring gear and carrier respectively, a brake drum attached to the sun gear, a clutch shoe having a radially movable, corcumferentially fixed association with said brake drum, a weighted lever pivoted on the brake drum and coacting with the clutch shoe to establish clutching engagement with both of said clutch drums whereby to lock said elements in direct drive, a declutching ring having a lost motion connection with said brake drum, a drum portion on said declutching ring axially adjacent said brake drum, a brake shoe adapted to simultaneously engage said brake drum and drum portion for restraining sun gear rotation and causing said declutching ring to move relative to the brake drum, said ring having a part adapted, when thus moved, to exert a camming action against said lever so as to render the same inoperative whereby to facilitate release of the clutch and the establishment of underdrive.

18. In a planetary transmission, the combination described in claim 5, said brake being a servo-acting brake.

19. In a planetary transmission, the combination described in claim 5, said brake comprising a rotatable drum, brake shoes for cooperating with the drum, wedge means for urging the shoes against the drum, and means permitting a limited relative movement between the wedge means and shoes under the influence of the drum to increase the wedging action.

WILLIAM B. OSBORNE.